United States Patent [19]

Anglehart

[11] Patent Number: 4,944,095
[45] Date of Patent: Jul. 31, 1990

[54] GUIDING DEVICE FOR A COMPUTER MOUSE

[76] Inventor: James Anglehart, 1537 Summerhill, Apt. 208, Montreal, Quebec, Canada, H3H 1C2

[21] Appl. No.: 453,862

[22] Filed: Dec. 20, 1989

[51] Int. Cl.⁵ .......................... B43L 7/00; H04N 1/10
[52] U.S. Cl. ...................................... 33/403; 358/473; 33/449; 235/483
[58] Field of Search ............. 33/403, 430, 1 AA, 32.2, 33/42, 41.1, 41.2, 23.03, 1 S, 1 C, 1 G, 1 L, 449, 1 R, 1 M; 235/472, 482–486, 449; 358/497, 473, 494; 434/116, 117; 250/566, 555, 271

[56] References Cited

U.S. PATENT DOCUMENTS

| | | | |
|---|---|---|---|
| 4,561,183 | 12/1985 | Shores | 33/1 M |
| 4,831,459 | 5/1989 | Kimura | 353/473 |
| 4,831,736 | 5/1989 | Bryant | 33/1 M |
| 4,838,791 | 6/1989 | Bogosian et al. | 235/449 X |

OTHER PUBLICATIONS

Xerox Disc. Journal, vol. 9, #2, Mar./Apr. 1984, Hand Operated Scanner by Tandon.

Primary Examiner—Harry N. Haroian

[57] ABSTRACT

There is disclosed a guiding device for use with a computer mouse, the device comprising a body, a friction strip provided on an edge member of the body for securing the mouse to the body while allowing the mouse to operate on a working surface, a bearing fixed to the body, a roller including a horizontal shaft having a longitudinal axis and two ends, the shaft being rotatable in the bearing, the bearing being axially translatable on the shaft, the roller further including working surface engaging wheels fixed to each end of the two ends, the roller substantially supporting the body, and a sight connected to the body for guiding the device to trace an image on the working surface, the device being able to be moved on the working surface in a direction of the axis by a translation of the bearing on the shaft and in a direction perpendicular to the axis by a rolling of the wheels on the working surface.

14 Claims, 1 Drawing Sheet

GUIDING DEVICE FOR A COMPUTER MOUSE

FIELD OF THE INVENTION

The present invention relates to a guiding device for use with a computer mouse to permit tracing an image.

BACKGROUND OF THE INVENTION

It is known to attach a device to a computer mouse in order to be able to use the mouse for tracing images or digitizing. These devices work by maintaining the mouse fixed at a given angle with respect to the plane on which the mouse is moved. U.S. Pat. No. 4,561,163 describes how this is done and shows the use of drafting table arms to accomplish the fixing of the mouse angle. U.S. Pat. No. 4,831,736 describes a mouse carriage having wheels whose steering angles are maintained to be the same such that the angle with respect to the plane on which the carriage is moved remains fixed. In the two above mentioned U.S. patents, the cost of the devices is substantial, since their construction is rather complicated.

SUMMARY OF THE INVENTION

It is therefore an object of the present invention to provide a computer mouse guiding device for use in tracing an image, which is inexpensive to construct and easy to use.

According to the invention, the guiding device for use with a computer mouse comprises a body, securing means provided on the body for securing the mouse to the body while allowing the mouse to operate on a working surface, bearing means fixed to the body, roller means including a horizontal shaft having a longitudinal axis and two ends, the shaft being rotatable in the bearing means, the bearing means being axially translatable on the shaft, the roller means further including working surface engaging wheels fixed to each end of the two ends, the roller means substantially supporting the body, and sighting means connected to the body for guiding the device to trace an image on the working surface, the device being able to be moved on the working surface in a direction of the axis by a translation of the bearing means on the shaft and in a direction perpendicular to the axis by a rolling of the wheels on the working surface.

Preferably, the axis is in use substantially aligned with a side of the mouse, and the securing means comprise a substantially vertical edge member being connected to the body and substantially parallel to the axis, the edge member having two sides, one of the two sides engaging in use a side of the mouse, another of the two sides providing in use a thumb rest for a user of the device, and friction strip means, fixed to the one side of the edge member or to the mouse or both, for preventing in use any slip between the edge member and the mouse when pressure is applied between the other side and the mouse.

Also, the friction strip means may preferably comprise a strip of neoprene or rubber fixed to the one side of the edge member.

BRIEF DESCRIPTION OF THE DRAWINGS

Other objects and advantages of the invention will become clear by the following description of a preferred embodiment with reference to the appended drawings in which.

DETAILED DESCRIPTION OF THE PREFERRED EMBODIMENT

Figure 1:
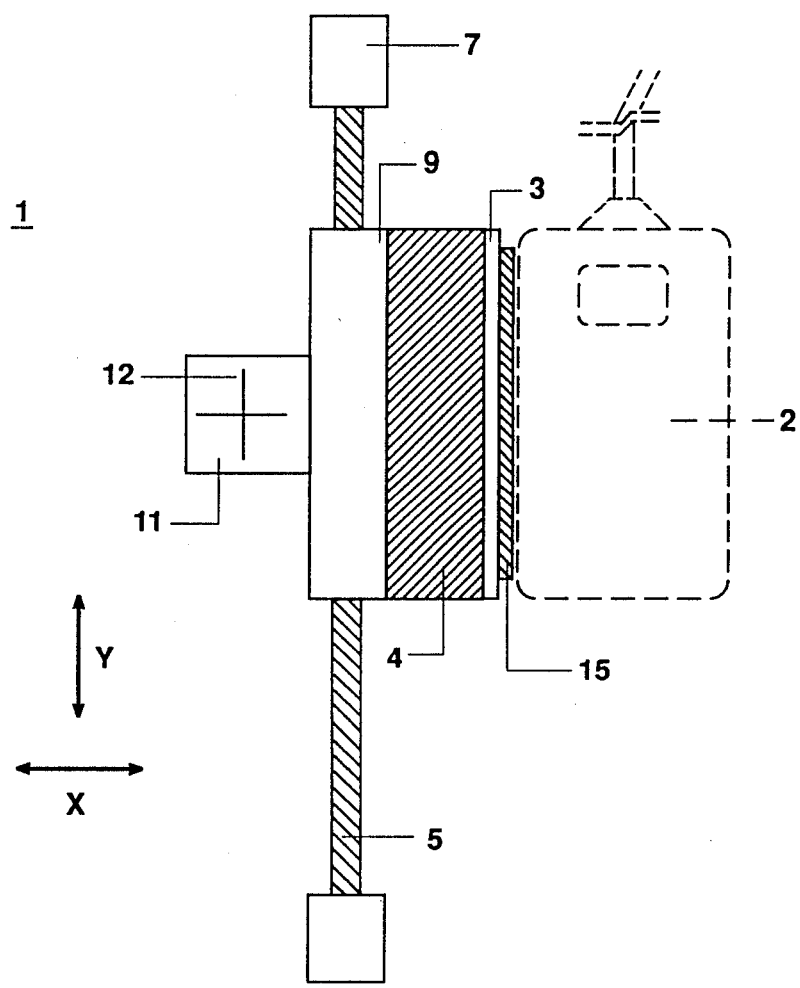
FIG. 1 shows a plan view of a guiding device according to the preferred embodiment.
Figure 2:
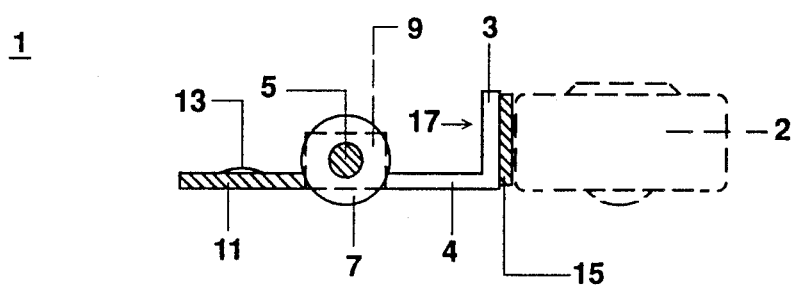
FIG. 2 shows a bottom side view of the guiding device of FIG. 1.

As shown in FIG. 1, the mouse guiding device 1 comprises a body made of edge member 3, base 4, bearing 9 and sight 11. As shown in FIG. 2, edge member 3 is connected to base 4 at the bottom thereof. Base 4 then connects to bearing 9, and sight 11 connects to bearing 9 on the outer side. A shaft 5 is rotatable and translatable in bearing 9, that is shaft 5 may roll in the X direction shown in FIG. 1 and the bearing 9 with the body may move in the Y direction shown. Two wheels 7 are fixed to the shaft 5 at the ends thereof. Mouse 2 shown in dotted lines is held in use against edge member 3 as shown. Edge member 3 and shaft 5 are substantially parallel.

As shown in FIG. 2, edge member 3 has a thumb rest side 17 and a rubber or neoprene friction strip 15 fixed to the other side of member 3. A side of mouse 2 when held against strip 15 is prevented from slipping.

The sight 11 is shown in FIG. 2 to include a convex formation representing a magnifier 13 for optically magnifying an image lying underneath magnifier 13. The sight 11 and cross hairs 12 are located at the middle of the side of guiding device 1, so that device 1 may be used on either side of mouse 2 depending on whether the user of the device 1 is right or left handed, without changing the basic orientation.

The operation of the device 1 is simple. A user places mouse 2 against strip 15 and holds mouse 2 while encompassing with his or her thumb, the thumb rest 17. A gentle pressure on thumb rest 17 maintains device 1 secured with respect to mouse 2. Device 1 is then able to move on a working surface in either the X or Y direction. Movement in the X direction is the result of the shaft 5 and wheels 7 rolling, and therefore movement is unlimited. Movement in the Y direction is of course limited by the length of the shaft 5. This is suitable with most computer systems, since the range of the X direction is often larger than the range in the Y (landscape format). Cross hairs 12 are placed on an image to be traced and the device is used to guide the mouse 2 over the image as required. If the image recorded on the computer, to which the mouse 2 is connected, is crooked, then the device 1 must be positioned at a corrected angle with respect to the image.

Because device 1 is only able to move in the X or Y direction and cannot change its angular orientation with respect to the working surface, mouse 2 and cross hairs 12 will follow the same path of motion.

The roller means are constructed to offer substantially the same drag to movement in either the X or Y direction, so that when tracing curves or diagonal lines, the device 1 does not resist movement in one orthogonal component more than the other which can lead to tracing errors. With this object in mind, the diameter of wheels 7 is preferably only slightly larger than the diameter of shaft 5, so that movement in either the X or Y direction results in substantially the same movement of shaft 5 in bearing 9.

The bearing 9 and shaft 5 may be made of Teflon TM to reduce the drag of rotation and translation therebetween. Wheels 7 may be made of rubber or neoprene to ensure a good grip on the working surface. The wheels 7 may also be a piece of tube placed over the ends of the shaft 5 as shown in FIG. 2. A suitable clearance for base 4 and sight 11 above the working surface is approximately 0.5 to 1.0 mm.

Although the securing means described comprise a friction strip for hand holding, it is of course possible according to the invention to make use of other securing means such as a clamp mechanism.

It is to be understood that the invention may also be provided with two roller means parallel to one another. This provides a possibly improved balance for the body and better contact with the working surface, however, the cost of two roller means is more than one.

The above description of the invention is not intended to limit the scope of the present invention which is to be determined by the appended claims.

I claim:

1. A guiding device for use with a computer mouse, the device comprising:
    a body;
    securing means provided on said body for securing said mouse to said body while allowing said mouse to operate on a working surface;
    bearing means fixed to said body;
    roller means including a horizontal shaft having a longitudinal axis and two ends, said shaft being rotatable in said bearing means, said bearing means being axially translatable on said shaft, said roller means further including working surface engaging wheels fixed to each end of said two ends, said roller means substantially supporting said body; and
    sighting means connected to said body for guiding said device to trace an image on said working surface, said device being able to be moved on said working surface in a direction of said axis by a translation of said bearing means on said shaft and in a direction perpendicular to said axis by a rolling of said wheels on said working surface.

2. Device according to claim 1, wherein said axis in use is substantially parallel to a side of said mouse, and said securing means comprise:
    a substantially vertical edge member being connected to said body and substantially parallel to said axis, said edge member having two sides, one of said two sides engaging in use a side of said mouse, another of said two sides providing in use a thumb rest for a user of said device; and
    friction strip means, fixed to said one side of said edge member or to said mouse or both, for preventing in use any slip between said edge member and said mouse when pressure is applied between said other side and said mouse.

3. Device according to claim 2, wherein said friction strip means comprise a strip of rubber fixed to said one side of said edge member.

4. Device according to claim 1, wherein said sighting means include cross hairs marked on a transparent plate, said plate being positioned centrally on said body so that said cross hairs are located in use at a given perpendicular distance from the substantial middle of a side of said mouse.

5. Device according to claim 2, wherein said sighting means include cross hairs marked on a transparent plate, said plate being positioned centrally on said body so that said cross hairs are located in use at a given perpendicular distance from the substantial middle of a side of said mouse.

6. Device according to claim 3, wherein said sighting means include cross hairs marked on a transparent plate, said plate being positioned centrally on said body so that said cross hairs are located in use at a given perpendicular distance from the substantial middle of a side of said mouse.

7. Device according to claim 1, wherein said sighting means include magnifying means to optically magnify a part of said image.

8. Device according to claim 6, wherein said sighting means include magnifying means to optically magnify a part of said image.

9. Device according to claim 1, wherein said wheels have a diameter only slightly greater than said shaft, so that said bearing means offer substantially a same drag on said shaft to motion in either the direction of said axis or in the direction perpendicular to said axis.

10. Device according to claim 2, wherein said wheels have a diameter only slightly greater than said shaft, so that said bearing means offer substantially a same drag on said shaft to motion in either the direction of said axis or in the direction perpendicular to said axis.

11. Device according to claim 1, wherein said bearing means and said shaft have contacting surfaces made of Teflon.

12. Device according to claim 2, wherein said bearing means and said shaft have contacting surfaces made of Teflon.

13. Device according to claim 1, wherein said wheels have an outer surface made of rubber, such that said wheels make good frictional contact with said working surface.

14. Device according to claim 3, wherein said wheels have an outer surface made of rubber, such that said wheels make good frictional contact with said working surface.

* * * * *